United States Patent
Toussaint et al.

(10) Patent No.: US 10,079,905 B2
(45) Date of Patent: *Sep. 18, 2018

(54) CROSS DOMAIN IN-BROWSER PROXY

(71) Applicant: salesforce.com, inc., San Francisco, CA (US)

(72) Inventors: Alex Toussaint, San Francisco, CA (US); Chris Jolley, Lone Tree, CO (US); Jay Hurst, San Francisco, CA (US); Stephen L. Pepper, Highlands Ranch, CO (US); Kari L. Hotchkiss, Denver, CO (US); Saptarshi Roy, South San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/344,345

(22) Filed: Nov. 4, 2016

(65) Prior Publication Data
US 2017/0078429 A1    Mar. 16, 2017

Related U.S. Application Data

(63) Continuation of application No. 14/025,400, filed on Sep. 12, 2013, now Pat. No. 9,503,501.

(60) Provisional application No. 61/702,020, filed on Sep. 17, 2012.

(51) Int. Cl.
H04L 29/08 (2006.01)
H04L 29/06 (2006.01)
G06F 17/30 (2006.01)

(52) U.S. Cl.
CPC ......... H04L 67/2814 (2013.01); H04L 67/02 (2013.01); H04L 67/42 (2013.01); *G06F 17/30861* (2013.01)

(58) Field of Classification Search
CPC ............... H04L 67/2814; H04L 67/34; G06F 17/30861; G06F 21/6218; G06F 17/3089; G06Q 10/10
USPC .................. 709/201–204, 213, 217; 715/744
See application file for complete search history.

(56) References Cited

U.S. PATENT DOCUMENTS

| | | | | |
|---|---|---|---|---|
| 6,615,267 B1 * | 9/2003 | Whalen | ................... | H04L 29/06 709/203 |
| 7,194,503 B2 * | 3/2007 | Shell | ................... | H04L 41/0806 455/403 |
| 7,200,644 B1 * | 4/2007 | Flanagan | .......... | G06F 17/30899 707/E17.119 |
| 7,478,122 B2 * | 1/2009 | Campbell | ............... | H04L 67/02 709/203 |

(Continued)

Primary Examiner — Krista Zele
Assistant Examiner — Michael A Chambers
(74) Attorney, Agent, or Firm — Elliott, Ostrander & Preston, P.C.

(57) ABSTRACT

An in-browser proxy enables an application in a frame to make a cross domain request. The proxy executes within the browser, which has a first domain. The browser provides a frame in which a client application executes, which has a second domain. The request from the client application is a request for data access to the external domain. The proxy identifies a registration of the client application, and forwards the request to the external domain. The proxy receives a response to the request and provides the response back to the client application within the frame.

20 Claims, 6 Drawing Sheets

(56) References Cited

U.S. PATENT DOCUMENTS

| | | | | |
|---|---|---|---|---|
| 7,941,546 B2* | 5/2011 | Rice | | H04L 67/2814 709/203 |
| 8,219,598 B1* | 7/2012 | Appleton | | G06F 21/6263 707/705 |
| 8,423,651 B1* | 4/2013 | Grieve | | G06F 9/54 709/203 |
| 8,626,865 B1* | 1/2014 | Phillips | | G06F 17/30902 709/213 |
| 8,688,797 B2* | 4/2014 | Hesselink | | H04L 63/0209 709/211 |
| 9,262,593 B2* | 2/2016 | Kay | | G06F 21/00 |
| 9,319,270 B2* | 4/2016 | Bestmann | | H04L 41/0803 |
| 2005/0235044 A1* | 10/2005 | Tazuma | | G06F 17/30887 709/217 |
| 2008/0271046 A1* | 10/2008 | Lipton | | G06F 9/44521 719/311 |
| 2009/0132713 A1* | 5/2009 | Dutta | | G06F 17/3089 709/227 |
| 2009/0327421 A1* | 12/2009 | Fu | | G06F 17/3089 709/204 |
| 2010/0011121 A1* | 1/2010 | Van Geest | | G06F 17/30905 709/238 |
| 2011/0185038 A1* | 7/2011 | Yoon | | H04L 67/02 709/217 |
| 2012/0066296 A1* | 3/2012 | Appleton | | G06Q 30/02 709/203 |
| 2012/0110469 A1* | 5/2012 | Magarshak | | H04L 9/321 715/747 |
| 2012/0265780 A1* | 10/2012 | Gerard | | G06F 17/30864 707/769 |
| 2013/0275272 A1* | 10/2013 | Begin, Jr. | | G06Q 30/0623 705/26.63 |
| 2014/0047351 A1* | 2/2014 | Cui | | G06Q 10/06 715/744 |
| 2015/0127943 A1* | 5/2015 | Luo | | H04L 63/0428 713/168 |

\* cited by examiner

CROSS DOMAIN IN-BROWSER PROXY

CLAIM OF PRIORITY

This application is related to, and claims priority to, U.S. patent application Ser. No. 14/025,400, filed Sep. 12, 2013, and is related to, and claims priority to, U.S. Provisional Patent Application No. 61/702,020, filed Sep. 17, 2012. Patent application Ser. No. 14/025,400 and Provisional Application No. 61/702,020 are hereby incorporated by reference.

FIELD

Embodiments described are related generally to submitting requests across different domains, and embodiments described are more particularly related to a cross domain in browser proxy that allows for cross domain requests.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2013, Salesforce.com Inc., All Rights Reserved.

BACKGROUND

Businesses generate and store large amounts of data. Businesses commonly store their data in database systems, some of which may be managed by a different business. The database system may have different services and data access mechanisms than what a business uses for other data or services of its organization. Businesses frequently use tools that integrate both processes of the database system as well as local applications managed and/or hosted by the business itself. The integrated tools can help reduce the inconvenience and performance loss associated with a user switching between local applications and processes of the database system. Such integrated tools can be referred to as "mashups," which are frequently browser based combinations of services of a local host and processes of a remote server. The mashup is typically created with different frames providing content from different sources.

Mashups implemented in browsers typically encounter a restriction on accessing data across domains. The domains refer to services hosted by different servers or different systems. Thus, services hosted by a database system that provide access to data stored in the database can be a different domain than functions provided by an application hosted by a different server. The cross domain restrictions are particularly noticeable in browser based mashup systems. In browser based mashups, a browser running on a consumer or client device accesses a database system remotely, and includes functions hosted by a local server. Modern browsers impose cross domain restrictions, which prevent an application from one domain from accessing another domain. Such a policy makes sense, to prevent simply creating a mashup of a local application with a target system, which could then theoretically grant access to an attacker if the cross domain restrictions were not in place.

However, there are times when mashups are created specifically to provide integration of services from different domains. Thus, the developer and the database system owner would like a site (or web location) from one domain to be able to access a remote, separate domain. Traditionally, such mashups are only possible with server side proxies written specifically to allow communication from the local server to the server and/or database system of the other domain. Thus, a client device makes a request on its local server, within its own domain, and the local server accesses the remote domain. The traditional process requires development of the interface mechanisms on the server side, with different interfaces required for each different cross domain interaction desired.

While the burden of creating individualized server side interfaces for a small number of cross domain interactions, as the number of cross domain interactions increases, the burden quickly becomes very significant. Thus, for implementation of a database system that may receive requests for data from many external domains, the development requirements may be unmanageable. The added burden may be even higher for modern and developing database systems having different architectures from the traditional unitary database systems.

BRIEF DESCRIPTION OF THE DRAWINGS

The following description includes discussion of figures having illustrations given by way of example of implementations of embodiments described. The drawings should be understood by way of example, and not by way of limitation. As used herein, references to one or more "embodiments" are to be understood as describing a particular feature, structure, or characteristic included in at least one implementation. Thus, phrases such as "in one embodiment" or "in an alternate embodiment" appearing herein describe various embodiments and implementations, and do not necessarily all refer to the same embodiment. However, they are also not necessarily mutually exclusive.

Figure 1:
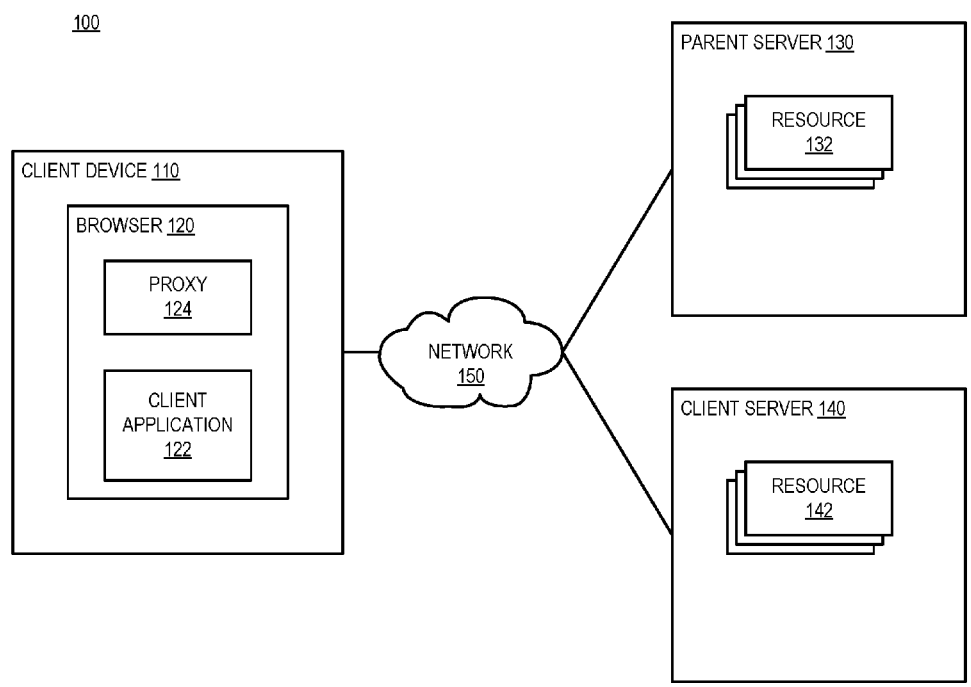
FIG. 1 is a block diagram of an embodiment of a system with an in browser proxy in a client device.

Descriptions of certain details and implementations follow, including a description of the figures, which may depict some or all of the embodiments described below, as well as discussing other potential embodiments or implementations of the inventive concepts presented herein. An overview is provided below, followed by a more detailed description with reference to the drawings.

DETAILED DESCRIPTION

As described herein, an in browser proxy enables an application in a frame to make a cross domain request. In one embodiment, the application is part of a mashup in the browser to provide access to an external system. The proxy executes within the browser, which has a first domain, which is the domain of the external system. The browser hosts a frame within a primary site in which a client application executes, which has a second associated domain, which is a domain of a server associated with the client that hosts the client application. The request from the client application is a request for data access to the first domain provided by the browser. The proxy identifies a registration of the client application, and forwards the request to the external domain. The proxy receives a response to the request and provides the response back to the client application within the frame.

It will be understood that the in browser proxy provides an exception to the general restriction against accessing an external domain from within one site from a web browser. Thus, a site from one domain can exchange requests and data with another domain, via the in browser proxy. The proxy requires authorization of the client application within the frame. The browser can execute multiple frames, where the application executes within one frame, and the proxy executes as part of or in parallel with the web browser. Based on authorization of the client application via the proxy, the external domain can trust the client application, and thus allow access from within the first domain of the client application. In one embodiment, the proxy can be implemented as a cross domain API (application programming interface), which is a component or process executing within the computing device on which the client application executes. The API provides an interface mechanism for one application to make a request to a service outside the application. The API can be called by the application to invoke a request on the external service.

In one embodiment, a developer creates the application, configuring the application to call the proxy or API. In one embodiment, the client application does not need to be coded, but is simply provided with addresses of services and/or processes to execute. In one embodiment, the development of the application includes loading components from a software development kit (SDK) to provide functionality, interfaces, and services to the application. Among the components that can be loaded, a developer can load an interface to a cross domain proxy provided by the browser. The developer can configure the application to access the cross domain proxy for requests outside the client server domain. Thus, the client application can include configured access to components hosted by a client server, which can be accessed via the client application directly from within its domain. The client application can include configured access to components hosted by a parent server, associated with the parent frame inside of which the client application executes in another frame. For access to components hosted by the parent server, the client application determines that the services are outside its domain, and makes a request via the proxy interface mechanism to allow the proxy to access the external domain on behalf of the client application.

In one embodiment, the external domain is a domain of an on demand database system. An on demand database system provides database services to a client. In one embodiment, the external domain is a domain of a business logic host or a server that provides business logic and/or web services. A business logic host provides web services to a client. Thus, the proxy interface can enable access to an external domain for database services, business logic, web services, or other services.

In a multitenant database system (MTS), a database system provides services to multiple different tenants or database customers. Each database customer can include multiple client devices or client applications that access the database. By providing a browser mashup, a client user can execute all services and applications locally at a client device, while still being able to access the database services via the web browser (e.g., accessing the database system via web services). For example, a browser can implement services via JavaScript, which allows it to be accessible via the browser, and executable on the client side. In such an implementation, there is no need to execute code on the server side or the database side. Thus, in one embodiment, nothing executes on the database system until the client application makes a request through the cross domain proxy. In one embodiment, the request is an XML (extensible markup language) HTTP (hypertext transport protocol) request (XHR). In one embodiment, the XHR request has a payload of XML data. In one embodiment, the XHR request has a payload of JSON (JavaScript Object Notation) data.

In one embodiment, the database system servicing the requests is a multitenant database, which provides a "cloud architecture" that allows a user to query for data in a modern database system. As referred to herein, a multitenant database stores data for multiple client organizations, which are each identified by a tenant ID. One or more users can be associated with each tenant ID. The one or more users of each client organization access data identified by the tenant ID associated with the respective client organization. The multitenant database is typically a database stored and hosted remote from the client organization. Typically, the multitenant database is hosted by an entity (e.g., company) separate from the client organization. An MTS as described herein can be said to provide on-demand database services. An MTS is typically a hosted system that provides as much database storage and service as required by each tenant.

In an MTS implementation, each tenant ID may have a set of data associations and relationships. Thus, a query on the MTS for one tenant ID may produce different results than the identical query on the MTS for a different tenant ID. In one embodiment, the architecture of each tenant ID develops separately with custom configuration for each tenant. For example, a UDD (user defined database) may be implemented for each tenant to store relationships and categorization data.

FIG. 1 is a block diagram of an embodiment of a system with an in browser proxy in a client device. System 100 includes a client that accesses a remote server device, such as a database system, over a network. More particularly, client device or client 110 accesses parent server 130 and/or client server 140 over network 150.

Client 110 represents any type of client device that may access a server system, for example, a desktop or laptop computer, a tablet, smartphone, server, or other computing device. Network 150 includes any type of network access that allows client 110 to access parent server 130 and client server 140. Network 150 may be or include any one or more networks such as local or wide area networks, wireless or wired, encrypted (e.g., virtual private network (VPN)) or open, on any of a variety of know or proprietary protocols, or other network. Network 150 is understood to include hardware and software components to enable remote connection of one device to another.

In one embodiment, parent server 130 is or is part of a database system, such as an on-demand database environment. As an on-demand environment, the database system can provide to client 110 the quantity of database resources needed, and when they are needed. As such, the database system can appear as a scalable database resource to client 110. In one embodiment, the database system has at least one aspect of its configuration that is configurable and scalable for different tenants. It will be understood that fundamentally, data stored is simply data. A database is a framework of how that data is stored, structured, and interpreted when stored and accessed. Thus, a database may be considered, in one embodiment, as a set of rules and procedures for storing, accessing, and manipulating data.

Client 110 includes browser 120, which is a web browser through which client 110 can access network locations and services. Browser 120 is an application that executes on client device 110, and provides rendering of and access to content retrieved from a network location (i.e., a location external to client 110). Browser 120 may also be able to render content accessed locally from client 110. In one embodiment, browser 120 executes client application 122, which is any kind of remotely hosted or provided application, such as a web application. A web application is an application received from a network location, which executes under browser 120. Application 122 running "under" browser 120 refers to the fact that application 122 can rely on certain interface logic being provided by browser 120.

Client application 120 is hosted by client server 140, and browser 120 receives the content from client server 140. Application 120 can provide access to one or more resources 142 from within browser 120. Resources 142 allow for services and/or data of client server 140 to be accessed remotely from within browser 120. In one embodiment, client 110 also accesses one or more resources 132 from parent server 130 over network 150 via browser 120. More particularly, in one embodiment, client application 122 can access one or more resources 132 from parent server 130. Parent server 130 is a different domain or software environment from client server 140. Thus, security access to parent server 130 does not necessarily provide access to client server 140. Parent server 130 and client server 140 are typically managed by different entities. Application 122 can access resources 132 from parent server 130 via in browser proxy 124.

Proxy 124 allows application 122 from one domain (the domain of client server 140) access the domain of parent server 130. In one embodiment, browser 120 accesses content from parent server 130, and is thus under the domain of parent server 130. The content from parent server 130 allows access to client server 140 to execute application 122 under browser 120. Typical security prevents application 122 from accessing the domain of parent server 130. However, application 122 can make requests via proxy 124, which allows application 122 access across domains to parent server 130. In one embodiment, proxy 124 includes JavaScript that interfaces with JavaScript within application 122. The JavaScript in application 122 can be configured to access proxy 124, which can verify the trustworthiness of the application to allow access to parent server 130.

In one embodiment, proxy 124 proxies cross domain XHR calls from application 122 for resources 132 of parent server 130. Resources 132 can include any data content or services provided by parent server 130. Proxy 124 provides an in browser proxy, which has advantages to other options for dealing with same origin restrictions. For example, creating a server side proxy would require configuration of parent server 130, and would also require a proxy for all different programming languages used to create client application 122. Other solutions (such as using JSONP or CORS) have deficiencies related to limited functionality and/or being unsecure, or working only in certain environments.

In one embodiment, proxy 124 is provided in browser 120 from parent server 130, and an SDK available to developers of client application 122 includes an API to make request for resources 132 (e.g., such as XHR calls). In such an implementation, the API forwards the requests to browser 120 under the domain of parent server 130, which submits the request on behalf of application 122. Proxy 124 can call a callback function of application 122 with the results of the request. In one embodiment, proxy 124 maintains and monitors the callback function of client application 122 loaded in browser 120.

In browser proxy 124 makes a connection across the domains when the connection is needed, and otherwise there could be no persistent connection across the domains. Proxy 124 and client application 122 can be served from respective servers and executed locally on client 110, which reduces load on parent server 130 because processes do not need to execute on parent server 130 until the request is made via proxy 124. In one embodiment, application 122 provides security credentials to proxy 124 so the application is trusted, and only once the application is trusted does the proxy forward requests across domains. Thus, a cross domain connection is made with security credentials provided by application 122. The security credentials and configuration to make requests to proxy 124 can be configured into application 124 at development.

In one embodiment, the providing of application 122 within browser 120 and the use of cross domain proxying allows interactions between application 122 and parent server 130 to be asynchronous. Application 122 can make a request via proxy, which then makes a request on parent server 130. The call from application 122 can be asynchronous, as well as the request from proxy 124 to parent server 130. Thus, no persistent connection is needed, and the reliability of interaction between application 122 and parent server 130 can be improved by using proxy 124.

Figure 2:
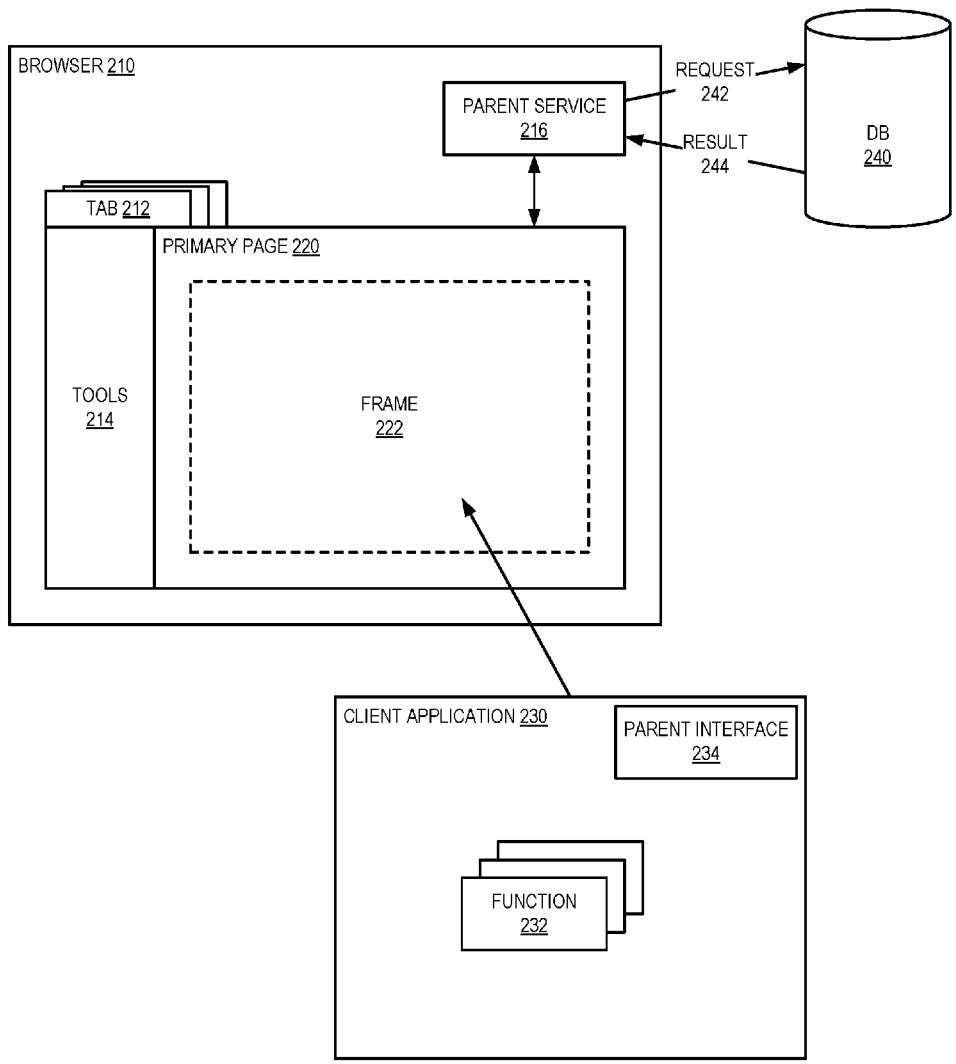
FIG. 2 is a block diagram of an embodiment of a system in which a client application executes in a frame of a browser that has an in browser proxy.

FIG. 2 is a block diagram of an embodiment of a system in which a client application executes in frame of a browser that has an in browser proxy. System 200 can provide one example of a system in accordance with system 100 of FIG. 1. The parent server is represented by database 240, which is a database to which client application 230 can make requests. Client application 230 is provided by a client server, which is not specifically shown in system 200. Browser 210 is part of a client device, which is not specifically shown.

Browser 210 is any type of web browser that allows access to network content. Browser 210 is typically controlled through the use of URL (uniform resource locators), which indicate a specific network location from which browser 210 accesses remote content. Browser 210 can include one or more tabs 212, which provide individual instances of network access to different network locations (e.g., different URLs). One or more other tabs could also provide access to a page that is separated into frames to allow content from multiple different locations to be accessed and viewed in a single window. Tools 214 represent tools provided by browser 210, and are arbitrarily placed in system 200. The location of the graphic representations of tools 214 can be anywhere within the browser. Tools 214 provide functions for a user to navigate one or more networks and/or access content via browser 210.

Browser 210 provides frame 222 within primary page 220. Frame 222 is a client frame, and could be, for example, an inline frame (iFrame). A frame is a container for code to execute within other code, or for content to be accessed and displayed within other content. An iFrame can be implemented, for example, as JavaScript executing within a parent site or primary page or as HTML (hypertext markup language) code within the primary page. Frame 222 enables browser 210 to concurrently display content from multiple different sources in a single window or page. Frame 222 allows execution of application 230 from one domain within a window (primary page 220) of content from a separate domain.

Client application 230 provides content from a client server (not shown), and has a different domain than primary page 220. Application 230 includes one or more functions 232, which allows a user to interact with content and/or services provided by the client server. Function 232 represents any functional element of the application. When a user interacts with functions 232, application 230 can make calls back to its domain to access (e.g., read and/or modify) data. In one embodiment, one or more functions 232 generate requests for data from database 240, which has a different domain than application 230. Namely, database 240 has a domain associated with primary page 220.

Under traditional operation, the same origin policy of browser 210 prevents application 230 from making a request to database 240, since they have different domains. In one embodiment, application 230 includes parent interface 234, which allows the application to make requests to the database via an in browser proxy. The proxy is or includes parent service 216, which can interface directly with database 240. Parent service 216 forwards request 242 to database 240, and receives results 244 in response to the request. Request 242 represents any type of database query and/or request for data and/or services. Parent interface 234 represents code for an interface embedded within application 230. Through parent interface 234, application 230 can provide cross domain requests to parent service 216, which can then make the request on database 240 on behalf of the application. In one embodiment, In one embodiment, parent interface 234 is a JavaScript process or file that executes when one or more functions 232 generates a request for data outside of the client's domain. In one embodiment, parent interface 234 executes in the background with respect to application 230, within frame 222. In one embodiment, parent service 216 can be a parent JavaScript process or file executing in the background of browser 210. Parent interface 234 can be configured specifically to make a call to parent service 216. Thus, in one embodiment, application 230 can make a request from one JavaScript process in the application to a JavaScript in the proxy to allow the proxy to forward the request on behalf of the application. In one embodiment, parent interface 234 makes an Ajax request to the parent frame (e.g., the frame of primary page 220, where parent service 216 can receive the request). In one embodiment, the request is an XML HTTP request.

In one embodiment, parent interface 234 includes security information in its request to parent service 216, which can enable parent service 216 to make a request within authorization of the client to database 240. For example, certain clients can have access to specific data and/or services from database 240. Certain data stored in database 240 can be associated with particular clients and require security credentials to be accessed. Thus, parent service 216 can provide the client's security credentials. Parent service 216 could also receive different security credentials from different clients (e.g., via different client applications (not shown)), and simply provide a request with the appropriate credentials for whichever client accesses the proxy.

In one embodiment, a developer registers application 230 with the parent domain of database 240. Thus, the database can recognize the security or authorization credentials of the application when the application makes cross domain requests. In one embodiment, the authorization credentials include an OAUTH, which identifies application 230, its network location or URL, and its security key(s).

Figure 3:
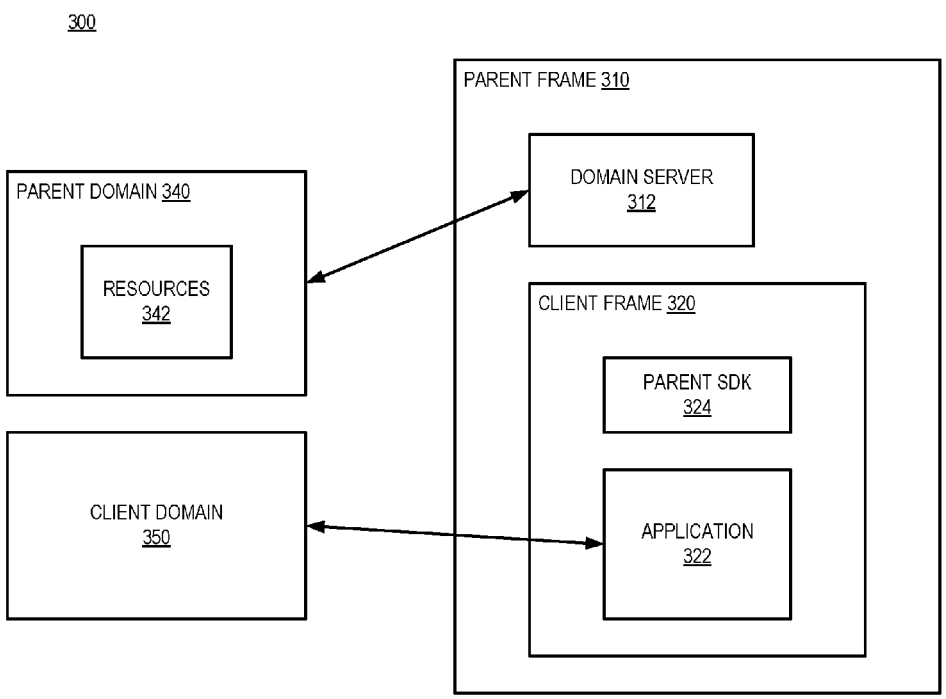
FIG. 3 is a block diagram of an embodiment of a parent frame and a client frame that use a cross domain proxy.

FIG. 3 is a block diagram of an embodiment of a parent frame and a client frame that use a cross domain proxy. System 300 can be one example of a system in accordance with system 100 and/or system 200. System 300 includes parent frame 310, which provides a primary page or a parent site within a browser (not specifically shown). System 300 also includes client frame 320, which provides a frame for content from another domain within parent frame 310. Parent frame 310 includes one or more mechanisms to proxy cross domain requests from within client frame 320 to the domain of parent frame 310.

Parent frame 310 provides content accessed from parent domain 340. Thus, parent frame 310 is considered to belong to, or have, or be associated with parent domain 340. Parent domain 340 is a source of content including resources 342. Domain server 312 represents one or more processes that execute under a browser that provides parent frame 310. Domain server 312 can execute in the background with respect to the content of parent frame 310, in that its execution does not necessarily produce any visible or obvious element within parent frame 310 to indicate to a user that the process(es) are executing. Domain server 312 provides mechanisms on the client device side to access the content of parent domain 340 in parent frame 310.

Client frame 320 executes within parent frame 310. Client frame 320 can execute as a separate application or a container within parent frame 310 for content external to parent domain 340. More particularly, client frame 320 executes application 322, which accesses content from client domain 350. Thus, the browser of system 300 includes a mashup of parent domain content and client domain content.

In one embodiment, client frame 320 executes parent SDK (software development kit) 324 to provide interface resources to application 322. As is understood, a software development kit provides tools to perform certain functions when integrated into an application. Thus, with tools from parent SDK 324 integrated into application 322, application 322 can access one or more resources 342 of parent domain 340, even though it is across domains. Thus, while parent SDK 324 is illustrated as a separate block, it will be understood that the parent SDK executes as elements of the SDK run as processes under application 322. In one embodiment, parent SDK 324 provides an API to make request for resources 342 (e.g., such as XHR calls). In such an implementation, the API forwards the requests to the parent frame, and the parent frame will submit the request on behalf of the application in the client frame. When the request is complete, the parent frame can call the application's callback function with the results.

The interaction among the elements of system 300 can occur as follows. In one embodiment, parent frame 310 registers for asynchronous requests from client frame 320, and specifically from application 322 within the client frame. In one embodiment, the client also registers for asynchronous requests from the parent frame. It will be understood that registering refers to providing an identifier and/or other indication that allows the registering entity to be monitored by the entity with which it registers. Thus, parent frame 310 registering with client frame 320 for asynchronous requests refers to parent frame 310 providing an identifier or handle or call to client frame 320, which the client frame stores. When the client frame has asynchronous requests to make, it retrieves the registration information and makes the request to parent frame 310. Similarly, client frame 320 registering for asynchronous requests from parent frame 310 refers to the client frame providing information for parent frame to store for use in identifying asynchronous requests from the client frame. Registering allows the registering entity to be identified.

In one embodiment, client frame 320 (via application 322) makes an asynchronous XHR request using one or more SDK libraries associated with parent SDK 324. In one embodiment, the client makes the request with a security token. Parent SDK 324 proxies the request the parent frame 310, and keeps track of a callback for application 322. Parent SDK 324 proxies the request to domain server 312, which is configured to makes requests on parent domain 340. Thus, in response to receiving the request from application 322, domain server 312 can invoke the XHR against parent domain 310. Parent domain 310 receives and processes the request and provides a result. In one embodiment, parent frame 310 receives the asynchronous callback for the client frame. Parent frame 310 invokes the callback registered with it during the registration process. Thus, based on registration, the proxy can hold a callback for the application, which allows it to provide the results to the application by invoking the callback.

Figure 4:
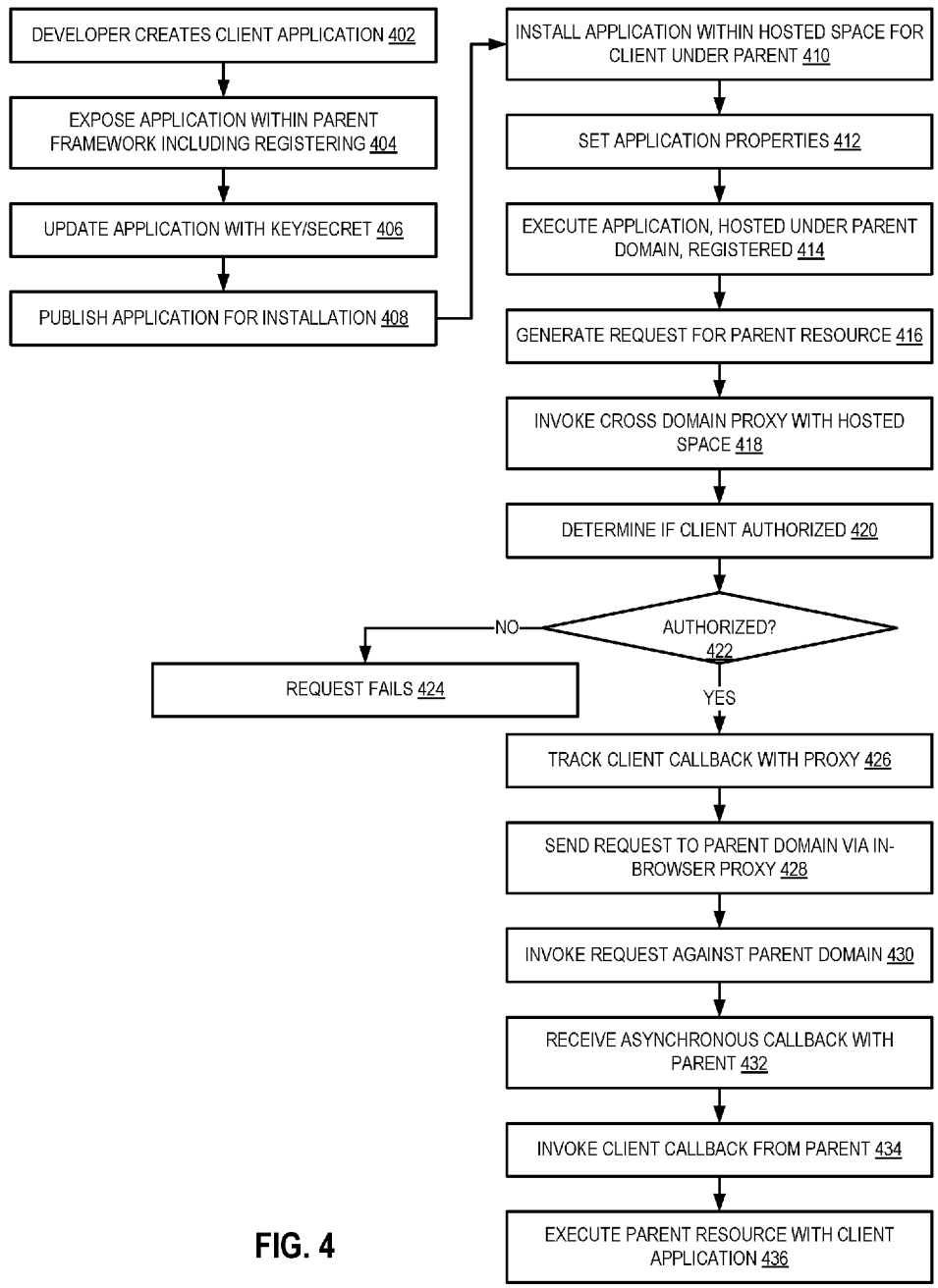
FIG. 4 represents a flow diagram of an embodiment of a process for proxying cross domain requests from within a frame to a parent domain.

FIG. 4 represents a flow diagram of an embodiment of a process for proxying cross domain requests from within a frame to a parent domain. Prior to execution of the application where cross domain proxying can be used, a developer configures the application to use cross domain proxying. In one embodiment, the developer configures the application during creation of the application. Thus, the developer creates the client application, 402. Part of creating the application can include the developer exposing the application within a parent framework, including registering the application, 404. The parent framework includes a server within a parent domain that the application will want to access when executed as an in browser application. Thus, the parent domain can store information related to the application so it will recognize calls from the application at a future time.

In one embodiment, the developer updates the application with a key or secret, 406, which a client organization associated with the client application uses to access the parent domain. Thus, the client organization is a client of the server and/or database of the parent domain, and develops a client application to work in browser, which the client would like to be able to access the parent domain. The developer configures the application with the key or secret or other security information that will allow the application to provide proper authorization information to access the parent under the client organization's client account. In one embodiment, the developer publishes the application for installation, 408. The publishing of the application allows a user who accesses the parent domain to see the application as a resource available for execution when accessing the parent domain. In one embodiment, only a user associated with the same client account will be able to access the client application registered under the client account.

The user interacts with the primary page of the parent domain, and generates a request to execute the application. The client server can then provide the application code, which the user browser then installs within a hosted space for the client under the parent domain. The hosted space refers to a frame within the browser to execute the application hosted by the client domain or the client server. The frame allows the client application, as content separate from the parent domain, to execute within the same browser providing access to the parent domain, under the primary site of the parent domain. In one embodiment, installing the application includes setting application properties, 412. The application properties can include parameters set by the user and/or conditions imposed on functionality of the application based on an authorization of the specific user. In one embodiment, installing the application includes registering the application with the parent domain, to indicate it is executing. Thus, the user executes the application under the parent domain, 414. The execution of the application includes execution of a parent domain interface that allows the application to be registered with the parent frame, and communicate with a proxy executing in the parent frame.

While the application is executing, a user interacts with the application, including interacting with functional elements of the application. The functional elements of the application allow the user to perform operations with the application. One or more operations that a user performs in the application cause the application to generate a request for one or more resources of the parent domain, 416. For example, if the parent domain is or includes a database system, the application can generate a request for data stored in the database. The application is configured to generate such a request to a proxy that provides cross domain access for authorized requests. Thus, the application invokes the cross domain proxy with the request, 418.

The proxy can determine if the client application is authorized to make the request, 420. If the client is not authorized, 422 NO branch, the request fails, 424. The application can be configured to present an error or indication if a request fails. If the client is authorized, 420 YES branch, the proxy sends the request to the parent domain, 428. The proxy sending the request to the parent domain allows the request to be made against the parent domain, 430, even though the request originated in the client domain. In one embodiment, the parent domain checks for authorization of the request. In one embodiment, the proxy does not check for authorization of the request, but the parent domain does. In one embodiment, the proxy sends the client credentials for the parent domain to authenticate the client.

In one embodiment, the proxy makes an asynchronous request to the database, which responds with an asynchronous callback, 432. Thus, the parent frame receives the asynchronous callback from the parent domain, and can invoke the client callback, 434. The parent frame provides the results to the client frame, which can then execute the parent resource in the client application, 436.

Figure 5:
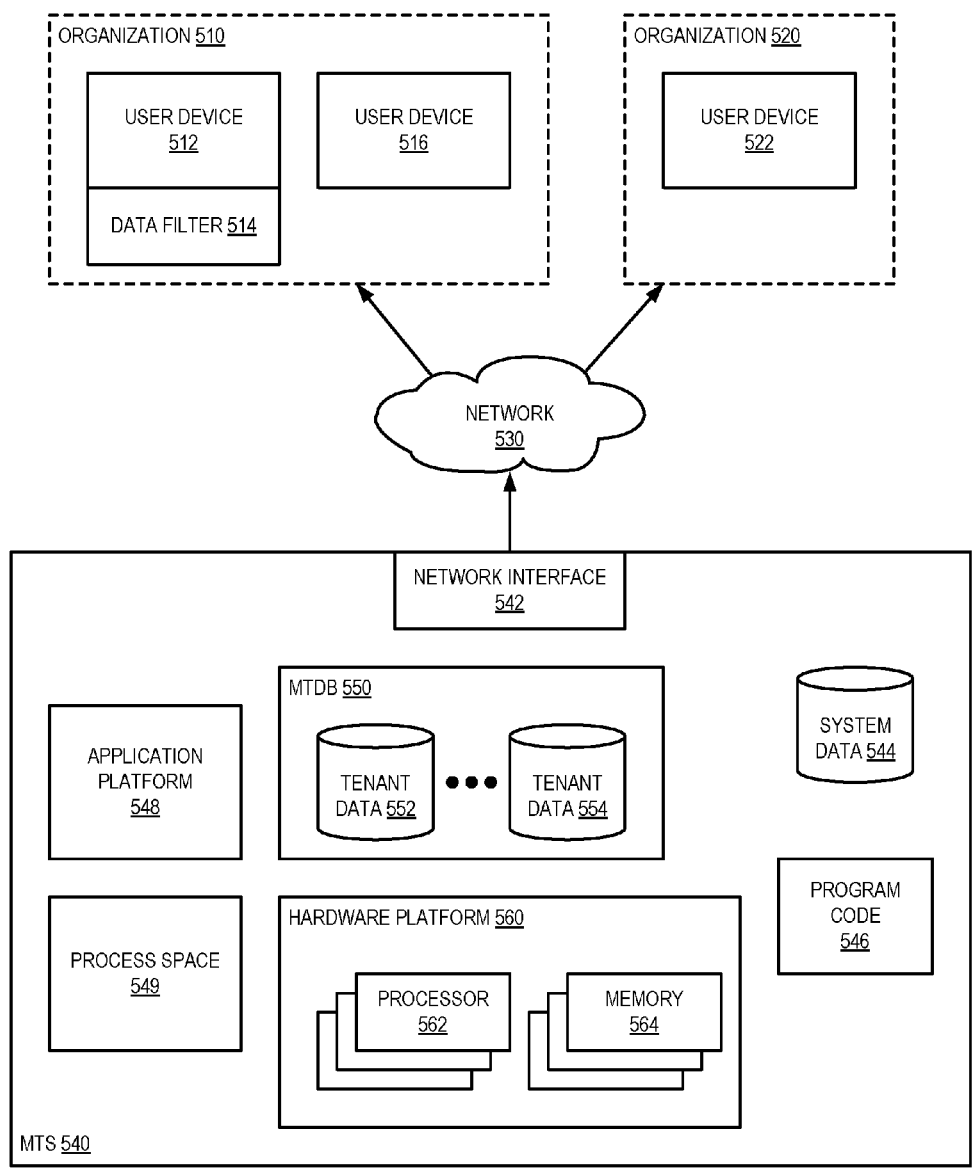
FIG. 5 is a block diagram of an embodiment of an environment for on-demand database services in which cross domain proxying can be implemented.

FIG. 5 is a block diagram of an embodiment of an environment for on-demand database services in which cross domain proxying can be implemented. Environment 500 includes components related to an on-demand database service. Environment 500 includes multitenant database system (MTS) 540 and one or more organizations 510 and 520, which are tenants of the MTS. Each organization can include one or more users and/or user devices.

MTS 540 provides on-demand database services for environment 500. An on-demand database service, such provided by MTS 540, is a database system that is made available to an outside user as needed by the user (e.g., on the demand of the user). Thus, a user does not necessarily need to be concerned with building and/or maintaining the database system, and rather can simply store and access data as needed from a remotely operated database system.

In one embodiment, MTS 540 stores information from one or more tenants into tables of a common database image or multitenant database (MTDB) 550. Accordingly, MTS 540 provides on-demand database service. A database image may include one or more database objects. A multitenant database stores data for various different tenants or organizations in a single database instance. Resources (such as memory, processing space, processing hardware, and other resources of the database system) are shared or allocated among the different tenants.

Multitenant database 550 includes tenant data 552, . . . , 554. The tenant data may be divided into different storage areas, which can be a physical and/or a logical arrangement of data. In one embodiment, multitenant database 550 is accessed via a relational database management system (RDBMS) or the equivalent, which executes storage and retrieval of information against the database object(s). In one embodiment, multitenant database 550 is accessed via an object-oriented database management system (OODBMS) or the equivalent. In one embodiment, multitenant database 550 is accessed via an object-relational database management system (ORDBMS) or the equivalent. It will be understood that an RDBMS manages data stored in the database based on a relational model, where data and data relationships are stored in tables. An OODBMS includes at least some integration of a database with an object-oriented programming language, and data is stored in the database in the same mode of representation as is provided in the programming language. An ORDBMS implements both a relational model and an object-oriented model, storing data in tables, and allowing representation of data consistent with a programming language.

Application platform 548 represents a framework that allows applications of MTS 540 to execute. Thus, application platform 548 includes the software components (such as an operating system) to allow execution of the applications. Hardware platform 560 provides hardware resources to enable the applications to execute on application platform 548, as well as enabling execution of management or control logic for MTS 540. In one embodiment, application platform 548 of MTS 540 enables creation, managing, and executing one or more applications developed by the provider of the on-demand database service, users accessing the on-demand database service via network 530, or third party application developers accessing the on-demand database service via network 530.

MTS 540 represents any type of system that may provide on-demand database service. In addition to application platform 548 and hardware platform 560, which includes processor resources 562 and memory resources 564, MTS 540 may include other components. MTS 540 includes network interface 542 to enable user devices to access MTS 540 over network 530. In one embodiment, MTS 540 includes system data 544, program code 546, and process space 549. System data 544 represents data specific to the running of MTS 540, rather than being tenant data. It is logically separated from the tenant storage, and may be physically separated (e.g., by designating storage areas or address ranges for system data). Program code 546 represents code to implement various functions of MTS 540, which enable the system to provide on-demand database service. Process space 549 represents a framework for executing MTS processes and tenant-specific processes, such as running applications as part of an application hosting service. It will be understood that MTS 540 may include more or fewer components than what is illustrated.

As mentioned above, environment 500 includes organizations 510 and 520, which represent tenants of MTS 540. Each organization may include one or more individual, and may be an individual or small company, up to a large corporation or organization. Thus, it will be understood that the number of user devices associated with each organization could potentially be hundreds or even thousands. Each organization is assigned a tenant identifier (ID) within MTS 540. Each tenant ID could have certain associated properties for use, depending on how the organization is configured. User device 522 is associated with organization 520, and access MTS 540 under the tenant ID of organization 520. Similarly, user devices 512 and 516 are associated with organization 510, and access MTS 540 under the tenants ID assigned to organization 510.

User devices 512, 516, and 522 may be any machine or system that is used by a user to access a database user system. For example, any of the user devices can be a handheld computing device, a mobile phone, a laptop computer, a work station, and/or a network of computing devices. Each user device can be provided with an on-demand database service from MTS 540 via network 530.

Within an organization, users may be further given access privileges and/or restrictions, as illustrated by data filter 514. As illustrated, user device 516 may access MTS 540 in accordance with whatever access is available to organization 510, while user device 512 has additional restrictions applied by data filter 514. In one embodiment, data filter 514 may additionally or alternatively provide specific user interface features for user 512 in accessing data from MTS 540.

The users of user devices 512, 516, and 522 may differ in their respective capacities, and the capacity of a particular user device might be entirely determined by permissions (permission levels) for the current user. For example, where a salesperson is using a particular user device to interact with MTS 540, that user device has the capacities assigned to that salesperson. However, an administrator using the same user device may have different capacities assigned to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level. Such enforcement could occur based on data filter 514, which can filter per device and/or could filter for the entire organization (e.g., a central filter as opposed to distributed filtering).

Network 530 represents any network or combination of networks. A network is generically an interconnection of devices that communicate with each other. Network 530 can be or include any combination of a LAN (local area network), WAN (wide area network), telephone network, wireless network, point-to-point network, star network, token ring network, hub network, or other appropriate configuration. TCP/IP (Transfer Control Protocol and Internet Protocol) networks are commonly used, such as the global internetwork of networks often referred to as the "Internet." Reference to specific networks in certain examples herein is meant only to provide examples, and is not limiting.

In one embodiment, user devices 512, 516, 522 (and other user devices not shown) communicate with MTS 540 over network 530 using TCP/IP and, at a higher network level, use other common protocols to communicate, such as HTTP (HyperText Transfer Protocol), FTP (File Transfer Protocol), AFS (Andrew File System—a distributed network filesystem using trusted servers), WAP (Wireless Access Protocol). In an example where HTTP is used, user device 512 might include an HTTP client commonly referred to as a "browser" for sending and receiving HTTP messages to and from an HTTP server at MTS 540 (not specifically shown, but which could be executed on hardware platform 560). Such an HTTP server might be implemented as the sole network interface between MTS 540 and network 530, but other techniques might be used as well or instead. In one embodiment, the interface between MTS 540 and network 530 includes load sharing functionality, such as round-robin HTTP request distributors to balance loads and distribute incoming HTTP requests evenly over a plurality of servers. At least as for the users that are accessing that server, each of the plurality of servers has access to data in MTS 540; however, other alternative configurations may be used instead.

In one embodiment, MTS 540 implements a web-based customer relationship management (CRM) system. For example, in one embodiment, MTS 540 includes application servers configured to implement and execute CRM software applications as well as provide related data, code, forms, webpages and other information to and from user devices (e.g., 512, 516, 522) and to store to and retrieve from a database system related data, objects, and webpage content. With a multitenant system, data for multiple tenants may be stored in the same physical database object; however, tenant data is typically arranged so that data of one tenant is kept logically separate from that of other tenants. The logical separation prevents one tenant from having access to another tenant's data. An express sharing of data among tenants is possible, which removes the logical separation. In one embodiment, MTS 540 implements applications other than or in addition to a CRM application. For example, MTS 540 may provide tenant access to multiple hosted (standard and custom) applications, including a CRM application. User (or third party developer) applications, which may or may not include CRM, may be supported by application platform 548, which manages creation, storage of the applications into one or more database objects and executing of the applications in a virtual machine in process space 549 of MTS 540.

In one embodiment, MTS 540 is configured to provide webpages, forms, applications, data and media content to user (client) device to support the access by user devices as tenants of MTS 540. In one embodiment, MTS 540 provides security mechanisms to keep each tenant's data separate unless the data is shared. More than one MTS may be used. If more than one MTS is used, the multiple systems may be located in close proximity to one another (e.g., in a server farm located in a single building or campus), or they may be distributed at locations remote from one another (e.g., one or more servers located in city A and one or more servers located in city B).

As used herein, each MTS could include one or more logically and/or physically connected servers distributed locally or across one or more geographic locations. Additionally, the term "server" refers to a computer system, including processing hardware and process space(s), and an associated storage system and database application (e.g., OODBMS, RDBMS, ORDBMS) as is known in the art. It will be understood that "server system" and "server" are often used interchangeably herein. Similarly, a database object described herein can be implemented as single databases, a distributed database, a collection of distributed databases, a database with redundant online or offline backups or other redundancies, and might include a distributed database or storage network and associated processing intelligence or logic.

In one embodiment, MTS 540 is a parent domain for a client application (not specifically shown) executing on a user device (e.g., 512, 516, 522). The client application executes within a frame subordinate to a frame that provides access to MTS 540. The client frame is of a different domain, and can thus provide the application. One or more processes executing in MTS 540 can receive asynchronous cross domain requests made via an in-browser proxy of a browser in the user device.

Figure 6:
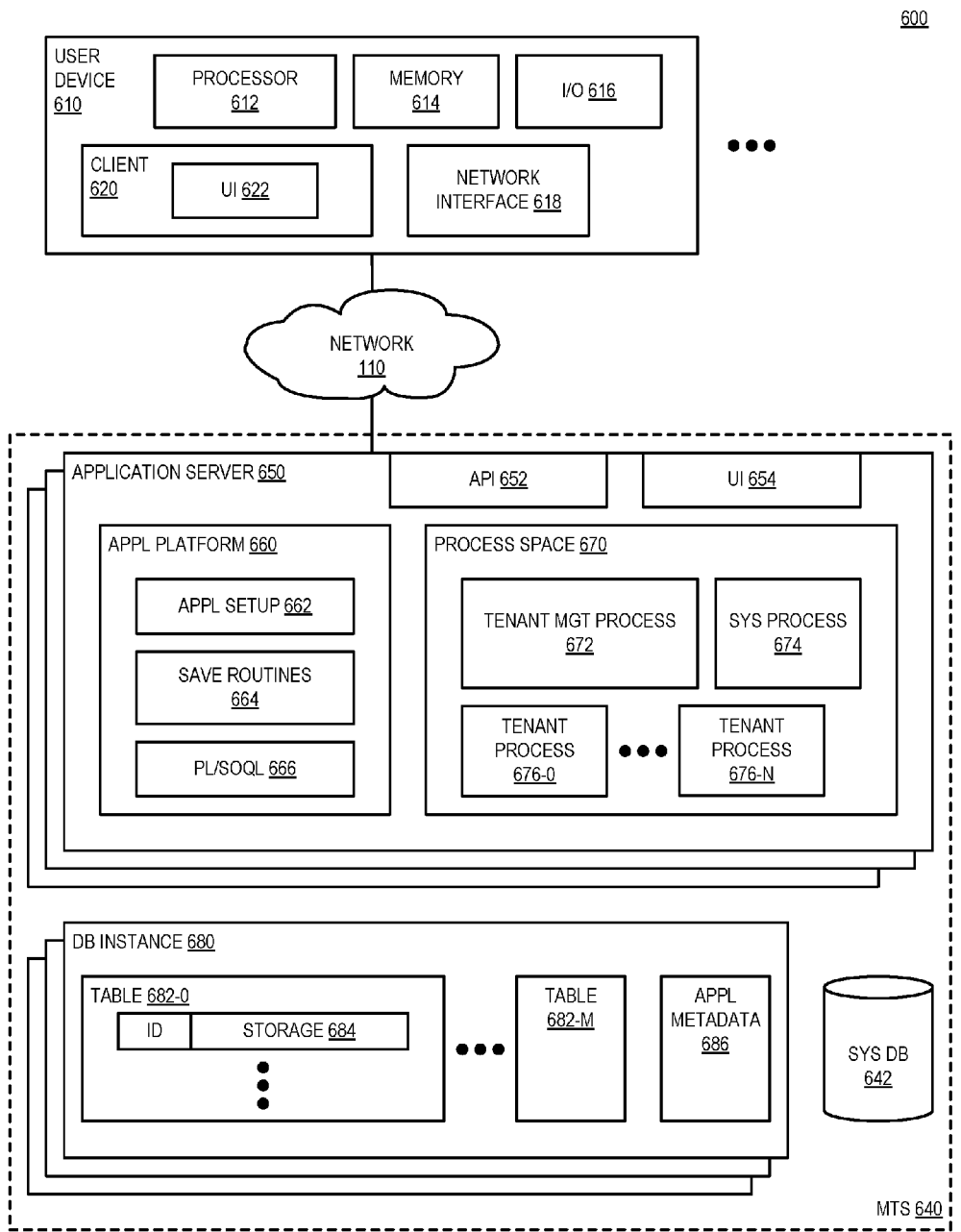
FIG. 6 is a block diagram of an embodiment of an environment for on-demand database services with a multitenant database having multiple data tables in which cross domain proxying can be implemented.

FIG. 6 is a block diagram of an embodiment of an environment for on-demand database services with a multitenant database having multiple data tables in which cross domain proxying can be implemented. Environment 600 includes components related to providing an on-demand database service, and may be one example of environment 500 of FIG. 5, with additional components shown. Environment 600 includes one or more multitenant database systems (MTS) 640 and one or more tenants of the MTS, as illustrated by user device 610. User device 610 is generally part of an organization that is the tenant, and user device 610 provides a computing device through which access to MTS 640 is available. MTS 640 provides on-demand database services for environment 600.

Environment 600 may include conventional, well-known elements that are explained only briefly here. For example, user device 610 (and any other user devices through which users access MTS 640) could include a desktop personal computer, workstation, laptop, handheld device, cell phone or smart phone, or any wireless access protocol (WAP) enabled device or any other computing device capable of interfacing directly or indirectly to the Internet or other network connection.

User device 610 includes processor 612, which represents one or more processor devices, and may be any combination of one or more processors. Processor 612 provides hardware means to execute programs and applications on user device 610. Memory 614 represents a memory system for user device 610, and may be any combination of one or more memory devices, short term, and/or long term memory. I/O (input/output) 616 represents any type of input and output devices such as keyboards, pointers and controllers, touchscreens, buttons, microphones, or other input mechanisms, and monitors, screens, printers, interfaces to networks, and/or other output devices.

User device 610 includes network interface 618, which represents hardware interconnections and control logic and circuitry to enable user device 610 to connect to network 630. Network interface 618 also has associated drivers and possibly other software components to allow user programs to interface with the interconnection hardware. User device 610 includes client 620, which represents a program that allows a user of user device 610 to access information from network 630, such as accessing MTS 640. UI 622 represents a user interface component of client 620, or a user interface in which information from client 620 is presented on user device 610. Thus, UI 622 may be integrated with client 620, or it may be separate from client 620, but display data related to the execution of client 620. UI 622 is rendered on display or user interface hardware or device, which can be understood to be represented by UI 622.

In one embodiment, user device 610 runs an HTTP client as client 620. An HTTP client may be, for example, a browsing program or a browser, which may include a WAP-enabled browser in the case of a cell phone, PDA or other wireless device. The HTTP client allows a user (e.g., subscriber of MTS 640) of user device 610 to access, process, and view information, pages, and applications available from MTS 640 over network 630, based on permissions and privileges. The user interface device of user device 610 can be used to access data and applications hosted by MTS 640, and to perform searches on stored data, and otherwise allow a user to interact with various GUI (graphical user interface) pages that may be presented to a user.

Similar to what is discussed above with reference to network 530 of environment 500, network 630 represents any network or group of networks over which access can be provided to MTS 640. Network 630 may include switching and/or routing elements, cables, connectors, and other components. In one embodiment, at least part of network 630 is the Internet, referring to a specific global internetwork of networks. However, it should be understood that other networks can be used in addition to or instead of the Internet, such as an intranet, an extranet, a virtual private network (VPN), a non-TCP/IP based network, any LAN or WAN or other network.

In one embodiment, user devices such as user device 610 (which may be client systems) communicate with application server 650 to request and update system-level and tenant-level data from MTS 640 that may require sending one or more queries to tenant data storage in database instance 680 and/or system data in system database 642. In one embodiment, MTS 640 (e.g., application server 650) automatically generates one or more SQL statements (e.g., one or more SQL queries) designed to access the desired information. System data storage in system database 642 may generate query plans to access the requested data from database instance 680.

In one embodiment, MTS 640 includes one or more application servers 650. From one perspective, application server 650 can be considered a network interface of MTS 640 to connect to network 630. Application server 650 exchanges (i.e., receives and/or transmits) data with network 630, such as receiving requests and sending replies or sending data. Application servers 650 may share hardware resources for interfacing with network 630, or they may be assigned separate resources. In one embodiment, one or more of application servers 650 can be implemented as an HTTP application server.

In one embodiment, each application server 650 is configured to handle requests for any user associated with any organization that is a tenant. Thus, a request from user device 610 could be received and processed at any application server 650. There may be advantages to avoiding affinity for a user and/or an organization or tenant to a specific application server 650, such as the ability to add and remove application servers from a server pool at any time for any reason, as well as for workload balancing among the servers. In an implementation where user and/or tenant affinity is used, an application server could not be removed without completing its jobs and/or handing off users to another server.

In one embodiment, an interface system implementing a load balancing function (e.g., an F5 Big-IP load balancer) is communicably coupled between application servers 650 and the user devices to distribute requests to the application servers 650. In one embodiment, the load balancer uses a least connections algorithm to route user requests to the application servers 650. Other examples of load balancing algorithms, such as round robin and observed response time, also can be used. For example, in certain embodiments, three consecutive requests from the same user could hit three different application servers 650, and three requests from different users could hit the same application server 650. In this manner, MTS 640 is multitenant, wherein MTS 640 handles storage of, and access to, different objects, data, and applications across disparate users and organizations. In one embodiment, Each application server 650 includes elements to provide database access service and request processing. Application server 650 includes API (application programming interface) 652 and UI 654. UI 654 represents server-side components that provide user interface elements that are provided to user device 610 for display. API 652 provides an interface for users and/or developers to access resident processes of MTS 640.

In one embodiment, application server 650 includes application (appl) platform 660, which provides a sub-environment on which applications hosted by application server 650 can be executed. Application platform 660 may include an operating system or other control logic, as well as business logic and common routines for use by the applications. As illustrated, application platform 660 includes application setup mechanism 662 that supports creation and management of applications, including configuration, by application developers, which may be saved as metadata into tenant data storage of database (db) instance 680. Save routines 664 represent the mechanisms used to store data in database instance 680, such as storing the application setup metadata. Such applications can be executed by subscriber users, for example, in process space 670.

In one embodiment, invocations to or related to such applications may be coded using PL/SOQL (Procedural Language Salesforce Object Query Language) that provides a programming language style interface extension to API 652. Thus, PL/SOQL 666 is capable of serving as a procedural extension to an on-demand database centric service API that allows flow control and transaction control to execute on a server in conjunction with database APIs (e.g., SOQL, data manipulation language (DML), or others). PL/SOQL 666 can enable the capability to thread together multiple SOQL/DML statements as a single unit of work on the server. PL/SOQL 666 need not necessarily be considered a general purpose programming language, seeing that it may be implemented as heavily data focused, but is not necessarily implemented that way. In one embodiment, PL/SOQL 666 can be used by developers to interlace with an on-demand database system, in contrast to traditional application developers' conventional tools, such as PL/SQL (Structured Query Language) of ORACLE, Inc. of Redwood Shores, Calif., and others.

In one embodiment, PL/SOQL 666 includes variable and expression syntax, block and conditional syntax, loop syntax, object and array notation, pass by reference, and other syntax known to other programming languages. Thus, full control over syntax and the ability to reference dynamic schema elements is provided with a new language and runtime for database services. Where embedded concepts that interface with on-demand database applications are provided, syntax and semantics that are easy to understand and which encourage efficient use of database APIs may also be employed. In one embodiment, PL/SOQL 666 is implemented as a strong typed language with direct (non-quoted) references to schema objects such as Object and Field names (both standard and custom).

More details about PL/SOQL language embodiments is discussed in commonly owned U.S. Provisional Patent Application 60/828,192 entitled, PROGRAMMING LAN- GUAGE METHOD AND SYSTEM FOR EXTENDING APIs TO EXECUTE IN CONJUNCTION WITH DATABASE APIs, by Craig Weissman, filed Oct. 4, 2006, now expired, which is incorporated in its entirety.

In one embodiment, invocations to applications may be detected by one or more system processes, which manage retrieving application metadata 686 for the subscriber making the invocation and executing the metadata as an application in a virtual machine. Metadata 686 provides data related to access and/or use of data stored in database instance 680. In one embodiment, metadata is stored in a separate table within database instance 680, and in an alternative embodiment, metadata 686 is stored with other data elements of user storage (such as with user storage 684 of table 682-0.

In one embodiment, application server 650 includes process space 670, which may include tenant process spaces 676-0 through 676-N (for some integer number N of process spaces configured in application server 650), tenant management process space 672 and system process space 674. It will be understood that process space 670 is an abstraction to illustrate the resources allocated for execution of processes (e.g., programs or applications) within application server 650. The skilled reader recognizes that memory and processor and other hardware resources may need to be allocated, as well as software resources to support the execution of a process. The processes may be executed as separate threads, or may share a thread. In one embodiment, the number N of tenant processes is equal to a number of subscriber tenants. In another embodiment, the number N of tenant processes may be higher than the number of subscriber tenants. Tenant management process 672 provides management of the other processes, including determining when certain processes execute. System process 674 executes operations related to functions of MTS 640.

Each application server 650 may be configured to tenant data storage in database instance 680 and the tenant data stored therein, and to system data storage of system database 642 and the system data stored therein to serve requests of user devices. As mentioned above, in one embodiment, tenant data is separated logically, and stored in the same multitenant database. In one embodiment, database instance 680 stores data in tables 682-0 through 682-M, where M is some integer number of tables. In one embodiment, different tables store data of different types. Application metadata 686 may be implemented as a separate table. Alternatively, one of the tables 682-0 through 682-M could be a table that stores varying types of objects, which are defined through metadata stored in the table.

In one embodiment, database instance is further implemented with user storage space distinct (e.g., identifiable) from its associated tenant. Thus, for example, user data may include the tenant ID, as well as an identifier specific to a user. Thus, storage 684 may represent either or both of tenant storage or user storage. For example, a copy of a user's most recently used (MRU) items might be stored to in user storage within database instance 680. Similarly, a copy of MRU items for an entire organization that is a tenant might be stored to a tenant storage area of database instance 680. In one embodiment, the tenant data and the system data (as illustrated by system database 642) are stored in separate databases.

Application servers 650 may be communicably coupled to database systems, e.g., having access to system database 642 and tenant database instance 680, via a different network connection. For example, one application server may be coupled via a network (e.g., the Internet), another application server might be coupled via a direct network link, and another application server might be coupled by yet a different network connection. The application servers may connect to the database systems via TCP/IP or another transport protocol, at least partially depending on the network interconnect used.

Regarding storage in database instance 680, one tenant might be a company that employs a sales force where each salesperson uses MTS 640 to manage their sales process. Thus, a user might maintain contact data, leads data, customer follow-up data, performance data, goals and progress data, and other data, all applicable to that user's personal sales process (e.g., storage 684, which may be tenant storage). Thus, all of the data and the applications to access, view, modify, report, transmit, calculate, or perform other operations can be maintained and accessed via a user device having nothing more than network access. In an example of an MTS arrangement, the user can manage his or her sales efforts and cycles from any of many different user devices. For example, if a salesperson is visiting a customer and the customer has a lobby with Internet access, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by MTS 640 that are allocated at the tenant level while other data structures might be managed at the user level. Because MTS 640 may support multiple tenants including possible competitors, MTS 640 should have security protocols that keep data, applications, and application use separate. Additionally, because many tenants may opt for access to an MTS rather than maintain their own system, redundancy, up-time, and backup are additional functions that may be implemented in MTS 640. In addition to user-specific data and tenant specific data, MTS 640 may also maintain system level data usable by multiple tenants or other data. Such system level data might include industry reports, news, postings, and the like that are sharable among tenants.

In one embodiment, each database instance 680 can be viewed as a collection of objects, such as a set of logical tables, containing data fitted into predefined categories. A "table" is one representation of a data object, and may be used herein to simplify the conceptual description of objects and custom objects according to what is described herein. It should be understood that "table" and "object type" may be used interchangeably herein. Each table generally contains one or more data categories logically arranged as columns or fields in a viewable schema. Each row or record of a table contains an instance of data for each category defined by the fields.

For example, a CRM database may include a table that describes a customer with fields for basic contact information such as name, address, phone number, fax number, or other information. Another table might describe a purchase order, including fields for information such as customer, product, sale price, date, or other fields. In one embodiment, a multitenant database has standard entity tables for use by all tenants. For CRM database applications, such standard entities might include tables for Account, Contact, Lead, and Opportunity data, each containing pre-defined fields. Thus, tables 682-0 through 682-M may include standard, defined tables.

In one embodiment, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", teaches systems and methods for creating custom objects as well as customizing standard objects in a multitenant database system. In one embodiment, for example, all custom entity data rows are stored in a single multitenant physical table, which may contain multiple logical tables per organization. It is transparent to customers that their multiple "tables" are in fact stored in one large table or that their data may be stored in the same table as the data of other customers.

In one embodiment, MTS 640 is a parent domain for a client application executing within a browser on user device 610. The browser provides information from MTS 640, and includes a frame which executes the client application from a different domain. One or more processes executing in MTS 640 can receive asynchronous cross domain requests made via an in-browser proxy in the browser on the user device.

Flow diagrams as illustrated herein provide examples of sequences of various process actions. Although shown in a particular sequence or order, unless otherwise specified, the order of the actions can be modified. Thus, the illustrated implementations should be understood only as an example, and the process can be performed in a different order, and some actions may be performed in parallel. Additionally, one or more actions can be omitted in various embodiments; thus, not all actions are required in every implementation. Other process flows are possible.

Various operations or functions are described herein, which may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communications interface to send data via the communications interface. A machine readable medium or computer readable medium may cause a machine to perform the functions or operations described, and includes any mechanism that provides (i.e., stores and/or transmits) information in a form accessible by a machine (e.g., computing device, electronic system, or other device), such as via recordable/non-recordable storage media (e.g., read only memory (ROM), random access memory (RAM), magnetic disk storage media, optical storage media, flash memory devices, or other storage media) or via transmission media (e.g., optical, digital, electrical, acoustic signals or other propagated signal). A communication interface includes any mechanism that interfaces to any of a hardwired, wireless, optical, or other medium to communicate to another device, such as a memory bus interface, a processor bus interface, an Internet connection, a disk controller. The communication interface can be configured by providing configuration parameters and/or sending signals to prepare the communication interface to provide a data signal describing the software content.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications may be made to the disclosed embodiments and implementations without departing from their scope. Therefore, the illustrations and examples herein should be construed in an illustrative, and not a restrictive sense.

What is claimed is:

1. A method performed by a system having at least a processor and a memory therein, wherein the method comprises:
   executing a browser at the system, wherein the system and the browser operates within a first domain;
   hosting an interface to a remote application within the browser executing at the system, the remote application executing within a second domain associated with an on-demand host server remote from the system;
   executing a proxy within the browser, the proxy being associated with both the first and the second domains;
   receiving, at the proxy executing within the browser, a request from the remote application executing within the second domain, the request seeking access to data or resources of the system operating within the first domain and outside of the second domain of the remote application associated with the on-demand host server;
   wherein the remote application includes configured access to components hosted by the on-demand host server and which are accessible via the remote application executing within the second domain directly from within its domain and further wherein the application includes configured access to components hosted by the system operating within the first domain, wherein access to the components hosted by the system in the first domain are accessible to the remote application executing within the second domain through the proxy executing within the browser; and
   providing a response to the request based on successful access to the data or resources of the system operating within the first domain by the remote application executing within the second domain.

2. The method of claim 1:
   wherein the request comprises a request by the remote application for data or resources hosted by the system in the first domain, external from the second domain within which the remote application operates;
   wherein the new request comprises a new request for the data or resources hosted by the system in the first domain, the new request being generated within the first domain;
   wherein the response to the new request comprises a response providing the data or resources hosted by the system in the first domain as requested by the new request; and
   wherein providing the response to the application comprises providing the data or resources hosted by the system in the first domain to the application executing within the second domain associated with the on-demand host server.

3. The method of claim 1:
   wherein the interface to the remote application executes within a client frame of the browser;
   wherein the proxy comprises a cross domain proxy for requests outside of the first domain within which the browser executes;

wherein the interface to the remote application includes addresses of services and/or processes to execute via the remote application executing at the second domain; and wherein the application further comprises configured access to the cross domain proxy executing via the browser.

4. The method of claim 1:

wherein the interface to the remote application executes within a client frame of the browser with configured access to components hosted by a parent server operating within the second domain and associated with the on-demand host server remote from the system through the proxy executing within the browser;

wherein the method further comprises identifying a registration of the remote application with the proxy by a parent frame to the client frame registering for asynchronous requests originating at the client frame from the interface executing within the client frame, wherein the registering includes the parent frame providing an identifier or handle to the client frame, with the identifier or handle to be monitored by the client frame and stored by the client frame; and wherein the interface executing at the system accesses components hosted by the parent server by first determining that requested services associated with the components are outside of its domain and then making a request, via the proxy, requesting the proxy to access the second domain within which the components reside on behalf of the interface.

5. The method of claim 1:

wherein the request comprises an XML (extensible markup language) HTTP (hypertext transport protocol) request (XHR).

6. The method of claim 4, wherein identifying the registration of the remote application further comprises checking authentication information for the remote application, and authorizing the remote application in the external domain in accordance with the authentication of the remote application with the proxy.

7. The method of claim 1, wherein the interface executing within the browser of the system interacts with a primary page of the second domain and generates a request to execute the remote application;

wherein the on-demand host server responsively provides application code for the remote application which is installed by the browser within a hosted space for the system under the second domain; and wherein the system then executes the remote application under the second domain and references the hosted space back to a frame within the browser executing at the first domain.

8. Non-transitory computer readable storage media having instructions stored thereupon that, when executed by a processor of a system, the instructions cause the system to perform operations including:

executing a browser at the system, wherein the system and the browser operates within a first domain;

hosting an interface to a remote application within the browser executing at the system, the remote application executing within a second domain associated with an on-demand host server remote from the system;

executing a proxy within the browser, the proxy being associated with both the first and the second domains;

receiving, at the proxy executing within the browser, a request from the remote application executing within the second domain, the request seeking access to data or resources of the system operating within the first domain and outside of the second domain of the remote application associated with the on-demand host server;

wherein the remote application includes configured access to components hosted by the on-demand host server and which are accessible via the remote application executing within the second domain directly from within its domain and further wherein the application includes configured access to components hosted by the system operating within the first domain, wherein access to the components hosted by the system in the first domain are accessible to the remote application executing within the second domain through the proxy executing within the browser; and providing a response to the request based on successful access to the data or resources of the system operating within the first domain by the remote application executing within the second domain.

9. The non-transitory computer readable storage media of claim 8:

wherein the request comprises a request by the remote application for data or resources hosted by the system in the first domain, external from the second domain within which the remote application operates;

wherein the new request comprises a new request for the data or resources hosted by the system in the first domain, the new request being generated within the first domain;

wherein the response to the new request comprises a response providing the data or resources hosted by the system in the first domain as requested by the new request; and wherein providing the response to the application comprises providing the data or resources hosted by the system in the first domain to the application executing within the second domain associated with the on-demand host server.

10. The non-transitory computer readable storage media of claim 8:

wherein the interface to the remote application executes within a client frame of the browser;

wherein the proxy comprises a cross domain proxy for requests outside of the first domain within which the browser executes;

wherein the interface to the remote application includes addresses of services and/or processes to execute via the remote application executing at the second domain; and wherein the application further comprises configured access to the cross domain proxy executing via the browser.

11. The non-transitory computer readable storage media of claim 8:

wherein the interface to the remote application executes within a client frame of the browser with configured access to components hosted by a parent server operating within the second domain and associated with the on-demand host server remote from the system through the proxy executing within the browser;

wherein the method further comprises identifying a registration of the remote application with the proxy by a parent frame to the client frame registering for asynchronous requests originating at the client frame from the interface executing within the client frame, wherein the registering includes the parent frame providing an identifier or handle to the client frame, with the identifier or handle to be monitored by the client frame and stored by the client frame; and wherein the interface executing at the system accesses components hosted by the parent server by first determining that requested services associated with the components are outside of its domain and then making a request, via the proxy, requesting the proxy to access the second domain within which the components reside on behalf of the interface.

12. The non-transitory computer readable storage media of claim 11, wherein identifying the registration of the remote application further comprises checking authentication information for the remote application, and authorizing the remote application in the external domain in accordance with the authentication of the remote application with the proxy.

13. The non-transitory computer readable storage media of claim 8:
    wherein the request comprises an XML (extensible markup language) HTTP (hypertext transport protocol) request (XHR).

14. The non-transitory computer readable storage media of claim 11:
    wherein the interface executing within the browser of the system interacts with a primary page of the second domain and generates a request to execute the remote application;
    wherein the on-demand host server responsively provides application code for the remote application which is installed by the browser within a hosted space for the system under the second domain; and
    wherein the system then executes the remote application under the second domain and references the hosted space back to a frame within the browser executing at the first domain.

15. A system comprising:
    a processor;
    a memory to perform instructions;
    the processor of the system to execute a browser;
    network interface hardware to connect the system with a first domain, wherein the system and the browser operate within the first domain;
    the browser to host an interface to a remote application, the remote application executing within a second domain associated with an on-demand host server remote from the system;
    the processor of the system to execute a proxy within the browser, the proxy being associated with both the first and the second domains;
    the proxy to receive a request from the remote application executing within the second domain, the request seeking access to data or resources of the system operating within the first domain and outside of the second domain of the remote application associated with the on-demand host server;
    wherein the remote application includes configured access to components hosted by the on-demand host server and which are accessible via the remote application executing within the second domain directly from within its domain and further wherein the application includes configured access to components hosted by the system operating within the first domain, wherein access to the components hosted by the system in the first domain are accessible to the remote application executing within the second domain through the proxy executing within the browser; and
    the proxy to provide a response to the request based on successful access to the data or resources of the system operating within the first domain by the remote application executing within the second domain.

16. The system of claim 15:
    wherein the request comprises a request by the remote application for data or resources hosted by the system in the first domain, external from the second domain within which the remote application operates;
    wherein the new request comprises a new request for the data or resources hosted by the system in the first domain, the new request being generated within the first domain;
    wherein the response to the new request comprises a response providing the data or resources hosted by the system in the first domain as requested by the new request; and
    wherein providing the response to the application comprises providing the data or resources hosted by the system in the first domain to the application executing within the second domain associated with the on-demand host server.

17. The system of claim 15:
    wherein the interface to the remote application executes within a client frame of the browser;
    wherein the proxy comprises a cross domain proxy for requests outside of the first domain within which the browser executes;
    wherein the interface to the remote application includes addresses of services and/or processes to execute via the remote application executing at the second domain; and
    wherein the application further comprises configured access to the cross domain proxy executing via the browser.

18. The system of claim 15:
    wherein the interface to the remote application executes within a client frame of the browser with configured access to components hosted by a parent server operating within the second domain and associated with the on-demand host server remote from the system through the proxy executing within the browser;
    wherein the proxy is to further identify a registration of the remote application with the proxy in which a parent frame to the client frame registers for asynchronous requests originating at the client frame from the interface executing within the client frame, wherein the registration includes the parent frame providing an identifier or handle to the client frame, with the identifier or handle to be monitored by the client frame and stored by the client frame; and
    wherein the interface executing at the system is to access components hosted by the parent server by first determining that requested services associated with the components are outside of its domain and then making a request, via the proxy, the request to instruct the proxy to access the second domain within which the components reside on behalf of the interface.

19. The system of claim 18, wherein identification of the registration of the remote application further comprises a check of authentication information for the remote application, and an authorization of the remote application in the external domain in accordance with the authentication of the remote application with the proxy.

20. The system of claim 15:
    wherein the request comprises an XML (extensible markup language) HTTP (hypertext transport protocol) request (XHR).

* * * * *